United States Patent
Brown et al.

(10) Patent No.: US 8,068,115 B2
(45) Date of Patent: Nov. 29, 2011

(54) IMAGE GENERATION WITH INTERPOLATION AND DISTORTION CORRECTION

(75) Inventors: Margaret K. Brown, Seattle, WA (US); Mark O. Freeman, Snohomish, WA (US); Mark Champion, Kenmore, WA (US); Aarti Raghavan, Redmond, WA (US); Shawn M. Swilley, Kent, WA (US); Kelly D. Linden, Lynnwood, WA (US)

(73) Assignee: Microvision, Inc., Redmond, WA (US)

( * ) Notice: Subject to any disclaimer, the term of this patent is extended or adjusted under 35 U.S.C. 154(b) by 1158 days.

(21) Appl. No.: 11/829,484

(22) Filed: Jul. 27, 2007

(65) Prior Publication Data

US 2007/0291051 A1   Dec. 20, 2007

Related U.S. Application Data

(63) Continuation-in-part of application No. 10/441,916, filed on May 19, 2003, now Pat. No. 7,580,007.

(51) Int. Cl.
*G09G 5/36* (2006.01)
*G09G 5/00* (2006.01)

(52) U.S. Cl. .................. 345/560; 345/647; 345/649

(58) Field of Classification Search .............. 345/530, 345/536, 537, 545, 560, 647, 649
See application file for complete search history.

(56) References Cited

U.S. PATENT DOCUMENTS

| | | | | |
|---|---|---|---|---|
| 2,543,066 A | | 2/1951 | Salinger | |
| 3,471,641 A | | 10/1969 | Baker et al. | |
| 3,686,435 A | * | 8/1972 | Ebeling | 348/123 |
| 4,298,965 A | * | 11/1981 | Kogo et al. | 367/13 |
| 4,736,107 A | * | 4/1988 | Myron | 250/492.2 |
| 4,819,196 A | * | 4/1989 | Lilley et al. | 708/3 |
| 4,975,691 A | | 12/1990 | Lee | |
| 5,097,257 A | * | 3/1992 | Clough et al. | 345/213 |
| 5,216,236 A | | 6/1993 | Blais | |
| 5,344,324 A | * | 9/1994 | O'Donnell et al. | 434/258 |
| 5,493,339 A | * | 2/1996 | Birch et al. | 348/461 |
| 5,659,327 A | | 8/1997 | Furness et al. | |
| 5,936,764 A | | 8/1999 | Kobayashi | |
| 5,955,724 A | | 9/1999 | Livingston | |
| 6,038,051 A | | 3/2000 | Suzuki et al. | |
| 6,140,979 A | | 10/2000 | Gerhard et al. | |
| 6,183,092 B1 | * | 2/2001 | Troyer | 353/31 |
| 6,204,829 B1 | | 3/2001 | Tidwell | |
| 6,628,330 B1 | * | 9/2003 | Lin | 348/252 |
| 6,756,993 B2 | * | 6/2004 | Popescu et al. | 345/646 |
| 6,765,578 B2 | * | 7/2004 | Slavin | 345/472 |
| 6,819,334 B1 | * | 11/2004 | Owada et al. | 345/659 |
| 6,850,211 B2 | * | 2/2005 | Deppe | 345/7 |
| 6,901,429 B2 | * | 5/2005 | Dowling | 709/203 |
| 2001/0024326 A1 | | 9/2001 | Nakamura et al. | |
| 2001/0034077 A1 | | 10/2001 | Wine et al. | |
| 2002/0163701 A1 | | 11/2002 | Plesko | |
| 2002/0163702 A1 | | 11/2002 | Hori et al. | |

FOREIGN PATENT DOCUMENTS
KR   1020000073553   12/2000

* cited by examiner

*Primary Examiner* — Joni Hsu
(74) *Attorney, Agent, or Firm* — Kevin D. Wills

(57) ABSTRACT

An image generation apparatus provides interpolation and distortion correction. The interpolation and distortion correction may be provided in one or two dimensions. Nonlinear image scan trajectories, such as sinusoidal and bi-sinusoidal trajectories are accommodated. Horizontal and vertical scan positions are determined using a linear pixel clock, and displayed pixel intensities are determined using interpolation techniques.

12 Claims, 16 Drawing Sheets

IMAGE GENERATION WITH INTERPOLATION AND DISTORTION CORRECTION

RELATED APPLICATIONS

Benefit is claimed under 35 U.S.C. 120 as a Continuation-in-Part (CIP) of U.S. application Ser. No. 10/441,916, entitled "Apparatus and Method for Bi-Directionally Sweeping an Image Beam in the Vertical Dimension and Related Apparati and Methods" by Brown et al., filed May 19, 2003, which is incorporated herein in its entirety by reference for all purposes.

FIELD

The present invention relates generally to display devices, and more specifically to distortion correction in display devices.

BACKGROUND

Some display devices create an image by scanning a beam of varying intensity across a display surface. For example, in cathode ray tubes (CRTs), an electron beam is scanned across a surface in a row and column pattern. Further, some projection display devices scan a light source across a surface in a row and column pattern. In these display devices, the beam intersects each pixel location as it paints the image row by row. The intensity of the scanned beam is then modulated as it passes over each display pixel location.

Some display devices may scan a beam in a trajectory that does not exactly coincide with rows and columns. For example, a projection display may scan a beam in a non-linear pattern such as a sinusoidal pattern. Non-linear beam trajectories cause the beam to traverse portions of the image that have no underlying pixel data, because there is no guarantee that a beam in a non-linear trajectory will intersect each point at which a pixel exists.

DESCRIPTION OF EMBODIMENTS

Figure 1:
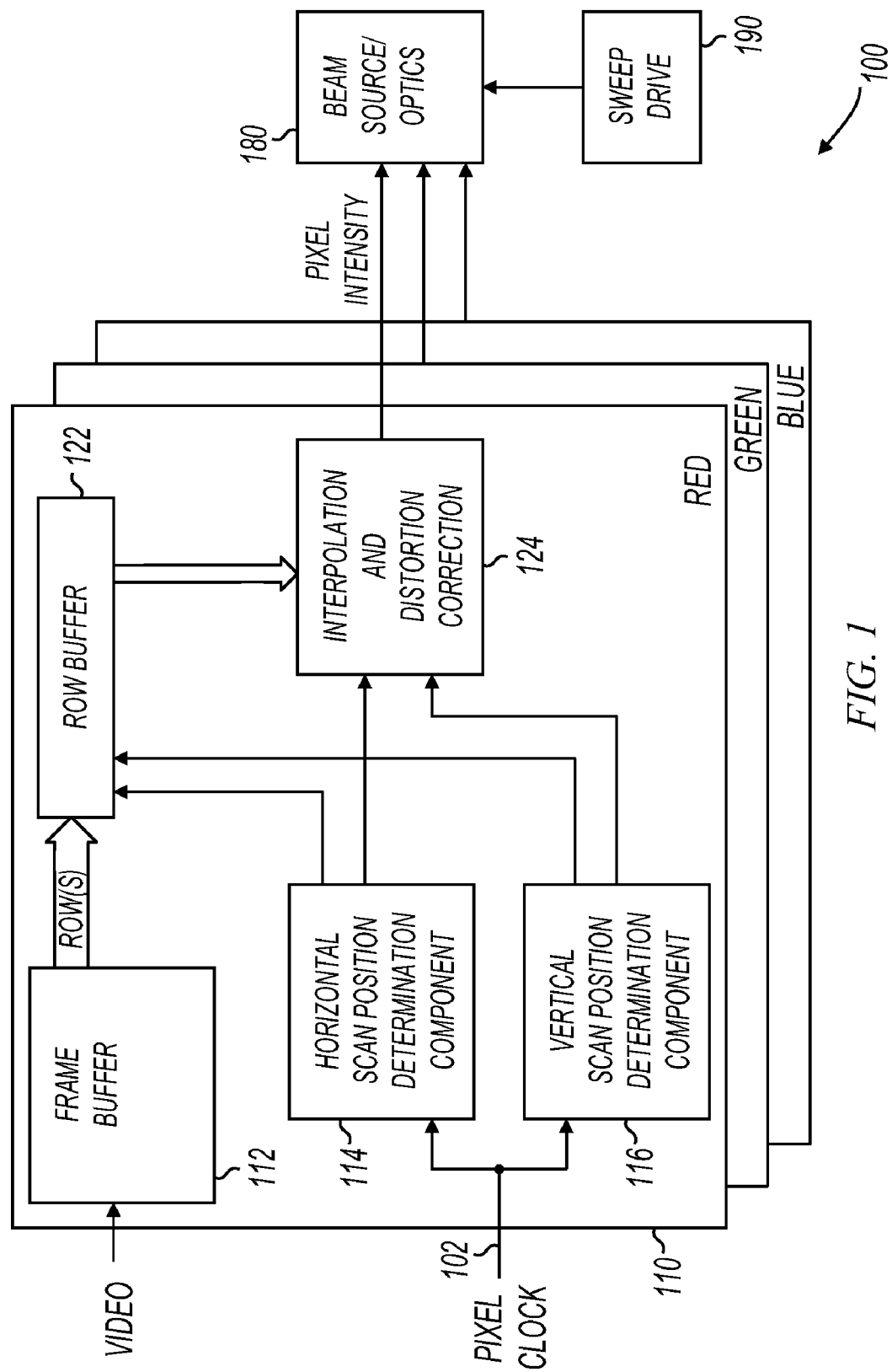
FIG. 1 shows an image generation apparatus with pixel interpolation and distortion correction.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows an image generation apparatus with pixel interpolation and distortion correction. Image generation apparatus 100 includes image processing device 110, beam source/optics 180, and sweep drive 190. Image processing device 110 includes frame buffer 112, row buffer 122, horizontal scan position determination component 114, vertical scan position determination component 116, and interpolation and distortion correction component 124. Image generation apparatus 100 may or may not process a color image. In embodiments represented by FIG. 1, the apparatus processes a color image, and three image processing devices 110 exist to process each of three colors (e.g., Red, Green, Blue).

In operation, sweep drive 190 provides signals to beam source 180 to cause a beam to scan a trajectory to paint a display image. The beam scan trajectory may take any form. For example, the scan trajectory may be linear in one direction and non-linear in another direction. Various embodiments further described below have a linear trajectory in the vertical direction and a non-linear trajectory in the horizontal direction. Other embodiments further described below have non-linear trajectories in both vertical and horizontal directions.

Frame buffer 112 holds rows and columns of pixel data that make up the image to be displayed. In some embodiments, frame buffer 112 is periodically updated at a predetermined rate to support video display. Frame buffer 112 may be a row oriented memory device capable of quickly reading entire rows of pixel data. One or more rows of pixel data may be read from frame buffer 112 to row buffer 122 for further processing. Various embodiments of row buffer 122 and processing associated therewith are described further below.

Image processing device 110 receives a periodic pixel clock on node 102. The pixel clock is provided to horizontal scan position determination component 114 and vertical scan position determination component 116. The pixel clock is a periodic clock that provides edges at periodic intervals having a constant period. In embodiments having non-linear scan trajectories, the scan beam may or may not be at a position in the display image that corresponds to a pixel.

Each time a pixel clock edge arrives, horizontal scan position determination component 114 determines (or provides) the current horizontal position of the beam within the displayed image. Similarly, each time a pixel clock edge arrives, vertical scan position determination component 116 determines (or provides) the current vertical position of the beam within the displayed image. The current vertical and horizontal scan positions are provided to row buffer 122 and interpolation and distortion correction component 124. Row buffer 122 provides pixel data to component 124 which then interpolates between pixel data and corrects for distortion.

In some embodiments, approximations are made as to one or both of the horizontal and vertical scan positions. For example, in some embodiments, the vertical scan position may be approximated as a constant row, even though this may not be 100% accurate. Also for example, in some embodiments, the vertical scan position may be approximated as a closest row, even though this may not be 100% accurate. In some embodiments, mathematical functions are evaluated at each pixel clock to determine the horizontal and vertical scan positions. For example, ramp functions or trigonometric functions may be evaluated. In some embodiments, a sum of sine functions is evaluated to approximate a triangular wave. These and other approximations are described below with reference to later figures.

Interpolation and distortion correction component 124 provides pixel intensity data to beam source/optics component 180. In some embodiments, this data is converted to a current to drive a light source. A higher pixel intensity value results in a higher current, which in turn results in a brighter displayed pixel.

The various components shown in FIG. 1 may be implemented in many ways. For example, components 114 and 116 may be implemented in dedicated hardware, software or any combination. When operating at slower speeds, software implementations may be fast enough to satisfy display rate requirements. When operating at high speeds, a dedicated hardware implementation may be fast enough to satisfy display rate requirements.

Figure 2:
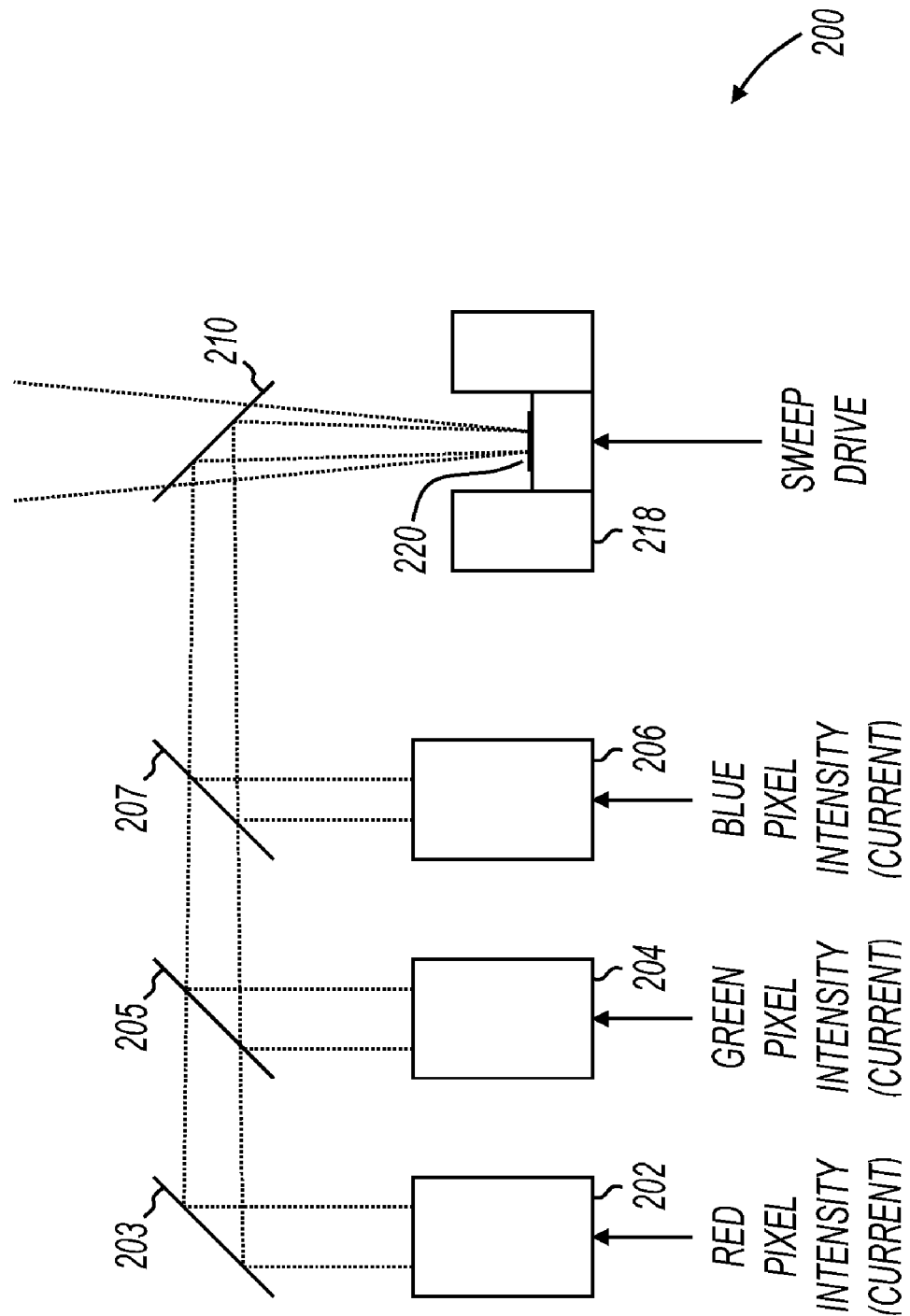
FIG. 2 shows a micro-projector.

FIG. 2 shows a micro-projector suitable for use in the disclosed image generation apparatus embodiments. Projector 200 may be used in apparatus 100 (FIG. 1) as beam source/optics component 180, although this is not a limitation of the present invention.

Projector 200 includes laser diodes 202, 204, and 206. Projector 200 also includes mirrors 203, 205, and 207, filter/polarizer 210, and micro-electronic machine (MEMS) device 218 having mirror 220. The laser diodes are driven by red, green, and blue intensity data (current) as described with reference to FIG. 1. Red, green, and blue light is provided by the laser diodes, although other light sources, such as color filters or light emitting diodes (LED's) or edge-emitting LED's, could easily be substituted. One advantage of lasers is that their light is produced as a column, and this column emerges as a narrow beam. When each beam is directed at the MEMS mirror (either directly or through guiding optics) the colors of light can be mixed on the surface of the mirror, pixel by pixel.

The MEMS mirror rotates on two axes to sweep the light beams in both horizontal and vertical directions. The trajectory that the beam takes is a function of the signals received from the sweep drive. In some embodiments, the beam may sweep back and forth horizontally in a sinusoidal pattern. Further, in some embodiments, the beam may sweep up and down vertically in a sinusoidal pattern. In general, the beam may be swept in any combination of horizontal and vertical patterns, including linear and non-linear patterns. Pixels may be displayed when the beam is sweeping in one direction or in both directions. For example, in some embodiments, pixels may be displayed as the beam sweeps down in the vertical direction, but not when the beam sweeps back up. Also for example, in some embodiments, pixels may be displayed as the beam sweeps down as well as when the beam sweeps up in the vertical direction.

This process of picture-building can be repeated many times per second, to reproduce moving pictures. Therefore, a MEMS mirror and three colored light sources can function like a traditional CRT monitor or television set, but without the metal and glass vacuum tube, and without the phosphors on a screen. Instead, this produces a small projector, with a nearly infinite focal point.

By using solid-state colored continuous beam laser diodes, it is possible to build such a projection device on the millimeter scale. Further, by modulating the power to each laser diode as needed to produce a particular color, it is possible to greatly reduce the electrical requirements of such a device. Together, this yields a projection device that can fit into a small form factor device, and that can run reliably on its stored battery power. The MEMS based projector is described as an example, and the various embodiments of the invention are not so limited. For example, other projector types may be included in image generation systems without departing from the scope of the present invention.

Figure 3:
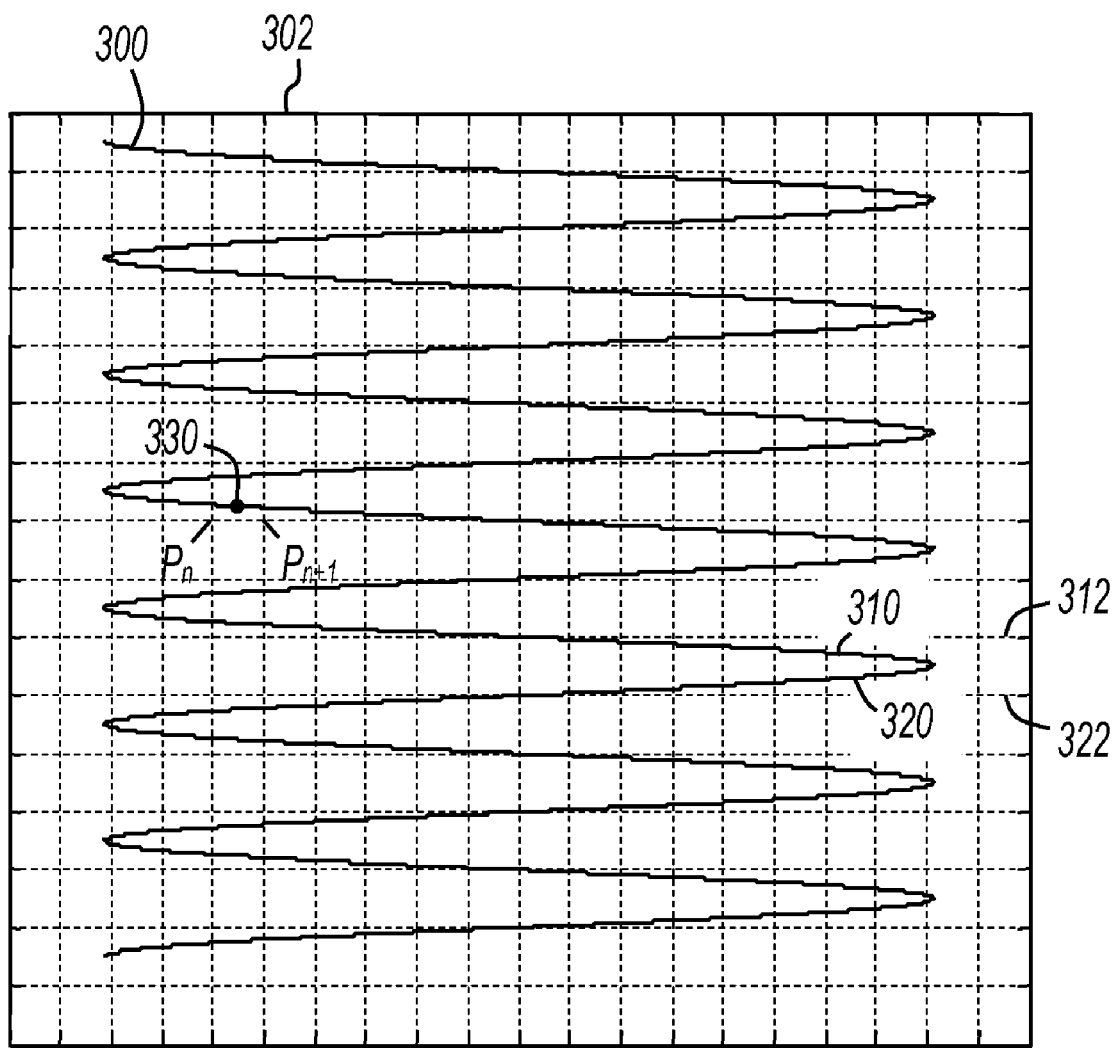
FIG. 3 shows a scan trajectory having a sinusoidal horizontal component and a linear vertical component.

FIG. 3 shows a scan trajectory having a sinusoidal horizontal component and a linear vertical component. Scan trajectory 300 is shown superimposed upon a grid 302. Grid 302 represents rows and columns of pixels that make up a display image. The rows of pixels are aligned with the horizontal dashed lines, and columns of pixels are aligned with the vertical dashed lines. The image is made up of pixels that occur at the intersections of dashed lines. Scan trajectory 300 has a sinusoidal horizontal component and a linear vertical component. On this trajectory, the beam sweeps back and forth left to right in a sinusoidal pattern, and sweeps vertically at a constant rate. In some embodiments, the trajectory sweeps up quickly during a "retrace" and pixels are not displayed on the retrace. In other embodiments, the trajectory sweeps up linearly at the same rate as it swept down, and pixels are display during both up and down vertical sweeps.

As described above with reference to FIG. 1, the image generation apparatus that produces scan trajectory 300 uses a linear pixel clock. The linear pixel clock results in displayed pixels that do not necessarily correspond in position to the pixels in grid 302. For example, a pixel clock edge may occur at point 330 which lies to the right of pixel $P_n$ and to the left of pixel $P_{n+1}$ in grid 302. The image generation apparatus may interpolate pixel intensity values between $P_n$ and $P_{n+1}$, and display the resulting pixel intensity at point 330.

Displayed pixels may outnumber pixels in the grid. For example, because the horizontal sinusoidal trajectory sweeps faster in the center than at either the left or right sides, a linear pixel clock that displays at least one pixel per column near the horizontal center will display more than one pixel per column near the left and right sides. In some embodiments, the pixel clock and sweep frequencies are timed to display about two pixels per column in the center, and about eight or more pixels per column near the left and right sides.

In some embodiments, the vertical sweep rate is set such that the number of horizontal sweeps equals the number of rows in the grid. For example, as shown in FIG. 3, each horizontal sweep 310 from left to right may corresponds to one row 312 and the following sweep from right to left 320 may correspond to the next row 322. As described below with reference to FIG. 4, the vertical scan position at any time may be approximated as a corresponding row. This introduces some image distortion where the displayed pixels are clustered near the left and right sides of the image, but also reduces processing complexity. This distortion is referred to herein as "raster pinch". In other embodiments, the vertical sweep rate is independent of, and not related to, the number of rows in the grid.

Figure 4:
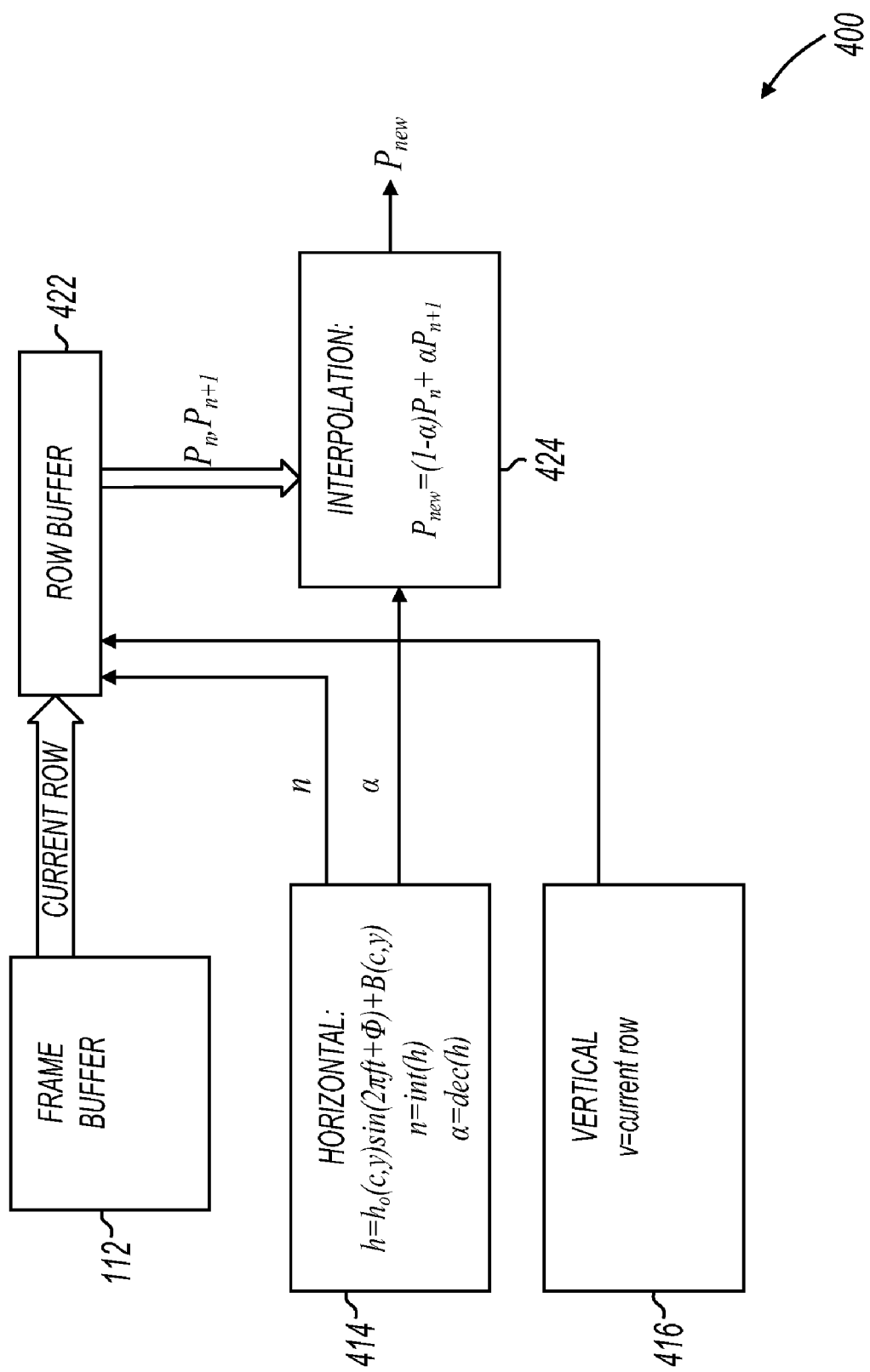
FIG. 4 shows an image processing device with interpolation and distortion correction for the scan trajectory of FIG. 3.

FIG. 4 shows an image generation apparatus with interpolation and distortion correction for the scan trajectory of FIG. 3. Image processing device 400 corresponds to embodiments of FIG. 3 in which the vertical scan position is approximated as the current row. Image processing device 400 includes frame buffer 112, row buffer 422, horizontal scan position determination component 414, vertical scan position determination component 416, and interpolation and distortion correction component 424.

Vertical scan position determination component 416 provides the current vertical scan position as the current row. In some embodiments, component 416 simply increments v each time the horizontal sweep reaches either the left or right side of the image. Row buffer 422 loads the current row from frame buffer 112 each time the vertical scan position v increments. In embodiments having a vertical retrace, v is incremented from zero to the total number of rows, and then restarts back at zero for the next vertical sweep from top to bottom. In embodiments having a bidirectional vertical sweep, v counts up in one vertical direction and counts down in the opposite vertical direction.

Horizontal scan position determination component 414 determines the current horizontal scan position at each pixel clock as $$h = h_o(c,y)\sin(2\pi f t + \Phi) + B(c,y). \quad (1)$$

As shown in equation (1), the horizontal scan position h is determined as the sum of an offset B and a scaled sine of a linearly increasing angle. The linearly increasing angle is created because t advances the same amount for each pixel clock. In some embodiments, the phase offset θ is not a constant. For example, in some embodiments, the phase offset is a function of one or both of the color being processed c, and the current vertical position y. The sine function is scaled by multiplier $h_o$. In some embodiments, the multiplier and or the offset are a function of one or both of the color being processed c, and the current vertical position y. Multiplier $h_o$ provides normalization so that h has a value in pixels between the left and right edges of the image. For example, for an 800×600 display with 800 pixels in each row, h may have a range of 800. In some embodiments, the range may be greater than 800 to accommodate overscan regions beyond the displayed image. The horizontal scan position h is broken down into the integer portion n and the decimal portion α. For example, if h is determined to be 6.4, (between the sixth and seventh pixel), then n=6 and α=0.4.

Row buffer 422 receives n and provides pixel intensity data for the $n^{th}$ pixel, $P_n$, and the pixel intensity data for the next pixel, $P_{n+1}$. Row buffer 422 provides $P_n$ and $P_{n+1}$ to interpolation and distortion correction component 424. Interpolation and distortion correction component 424 interpolates between $P_n$ and $P_{n+1}$ to determine the new pixel intensity $P_{new}$ as $$P_{new} = (1-\alpha)P_n + \alpha P_{n+1} \quad (2)$$

Equation (2) provides interpolation between pixels in the same row (the current row), and the current row changes for each horizontal sweep. Referring now back to FIG. 3, a pixel clock edge occurs when the scan trajectory is at point 330. The intensity of the displayed pixel is calculated by equation (2) using $P_n$ and $P_{n+1}$ which are on the current row.

In operation, row buffer 422 holds only one row (the current row) at a time because of the approximation that each horizontal sweep corresponds to one row. Prior to each horizontal sweep, row buffer 422 is loaded with one row of pixel data from frame buffer 112. The approximation saves power because multiple rows do not have to be accessed within frame buffer 112 to perform interpolation between rows.

Figure 7:
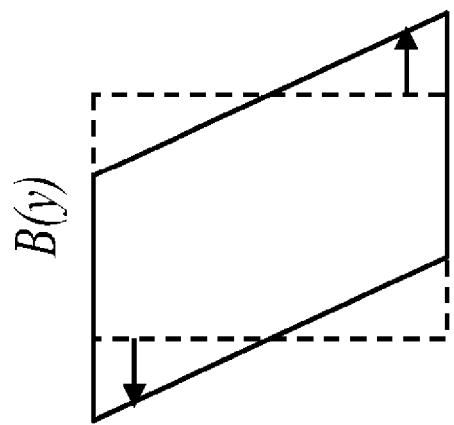
FIGS. 5-7 shows distortions corrected by the system of FIG. 4.
Figure 6:
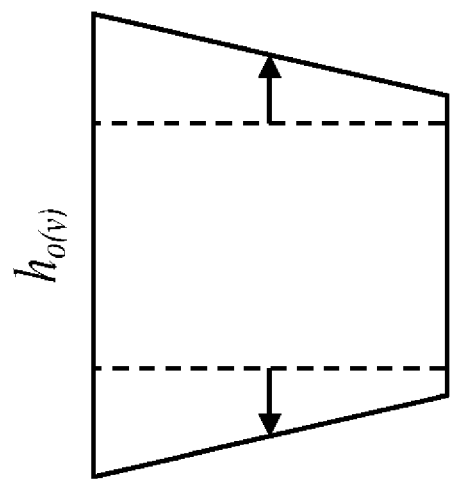
Figure 5:
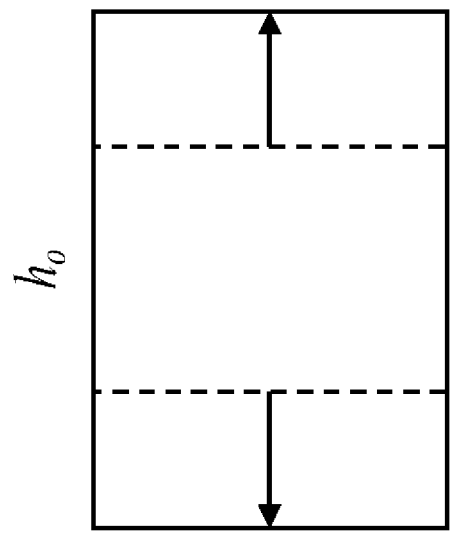

The offset B and the multiplier $h_o$ provide normalization as described above, and also provide horizontal distortion correction by modifying the current horizontal scan position. FIG. 5 shows the effect of a constant $h_o$. The entire image is stretched or contracted in the horizontal direction based on the value of $h_o$. FIG. 6 shows a possible effect of $h_o(y)$. The image may be contracted or stretched in the horizontal direction based on the vertical position y. In some embodiments, y is the same as v, and in other embodiments, y is determined using a separate function. FIG. 7 shows the effect of B(y). The amount of horizontal offset is shown as a function of y. By modifying $h_o$ and B, varying amounts of distortion correction can be provided.

In some embodiments, $h_o$ and B correct for distortion in the beam generation electronics and optics. For example, nonlinearities in the various circuits shown in FIG. 2 may be corrected by modifying $h_o$ and B. As described above $h_o$ and B can also be a function of color (e.g., red, green, blue). Each of the separate colors can be separately corrected so that the red, green, and blue images coincide on the screen.

Figure 8:
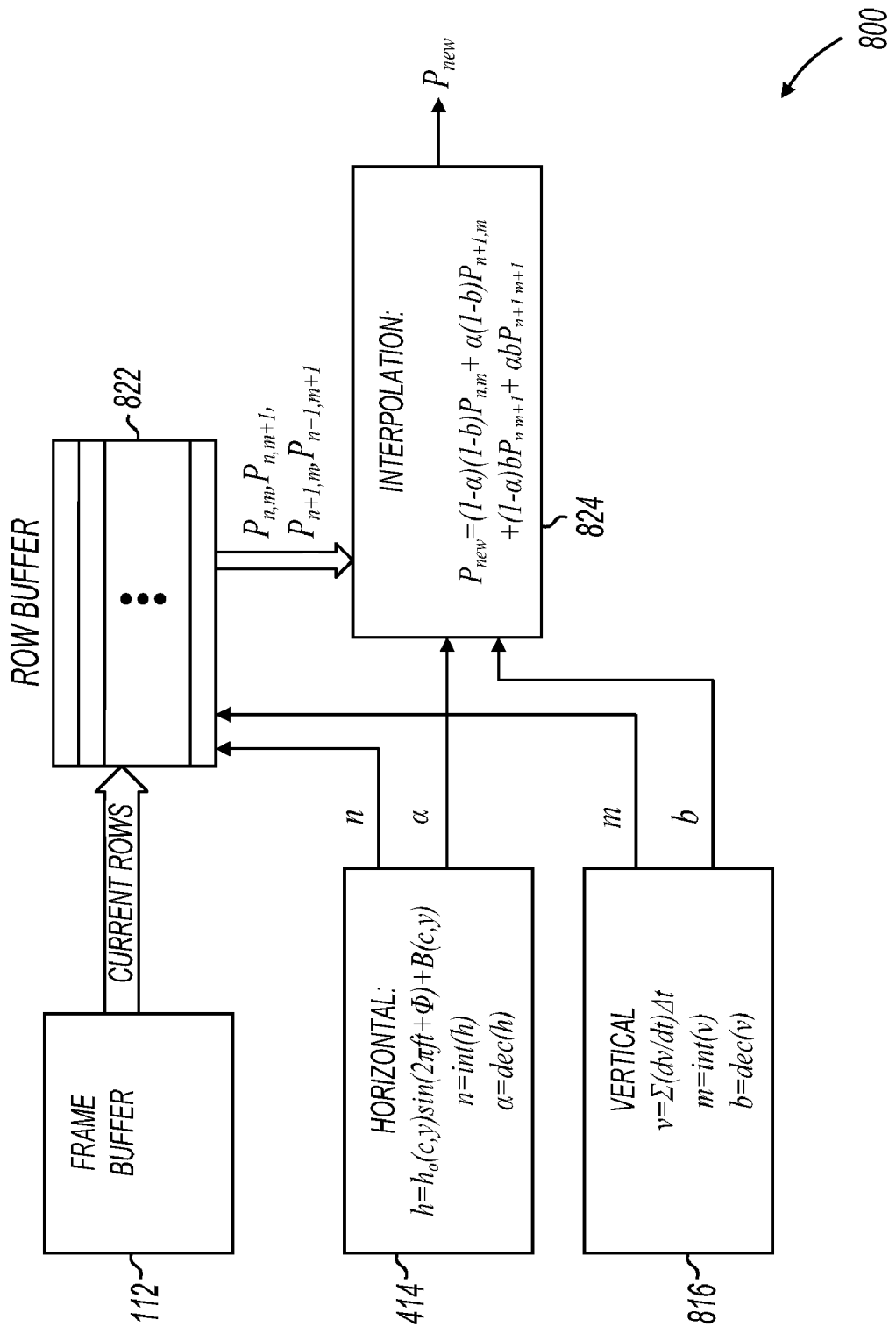
FIG. 8 shows another image processing device with interpolation and distortion correction for the scan trajectory of FIG. 3.

FIG. 8 shows another image processing device with interpolation and distortion correction for the scan trajectory of FIG. 3. Image processing device 800 differs from image processing device in that the vertical scan position is determined based on the linear trajectory rather than approximating the vertical scan position as the current row.

Device 800 includes frame buffer 112, row buffer 822, horizontal scan position determination component 414, vertical scan position determination component 816, and interpolation and distortion correction component 824. Frame buffer 112, horizontal component 414, and their operation are described above. Vertical scan position determination component 816 determines the vertical scan position v as $$v = \sum \frac{dv}{dI}\Delta t. \quad (3)$$

In some embodiments, the vertical scan position is determined as a sum of sine functions. For example, a triangular trajectory may be approximated by summing the first three sine functions in a Taylor series expansion of a triangular wave. Both horizontal and vertical trajectories may be implemented in this manner.

The vertical scan position v is broken down into the integer portion m and the decimal portion b. For example, if v is determined to be 9.7, (between the ninth and tenth pixel), then m=9 and b=0.7. Row buffer 822 receives n and m and provides pixel intensity data for pixels, $P_{n,m}$, $P_{n,m+1}$, $P_{n+1,m}$, and $P_{n+1,m+1}$ to interpolation and distortion correction component 824. Interpolation and distortion correction component 824 interpolates between $P_{n,m}$, $P_{n,m+1}$, $P_{n+1,m}$, and $P_{n+1,m+1}$ to determine the new pixel intensity $P_{new}$ as $$P_{new}=(1-\alpha)(1-b)P_{n,m}+\alpha(1-b)P_{n+1,m}+(1-\alpha)bP_{n,m+1}+ \alpha b P_{n+1,m+1} \quad (4)$$

Equation (4) is an example of linear interpolation between four pixels. This various embodiments of the invention are not limited to linear interpolation. For example, in some embodiments, nearest neighbor interpolation is used, and in other embodiments, higher order (e.g., cubic) interpolation is utilized.

Figure 9:
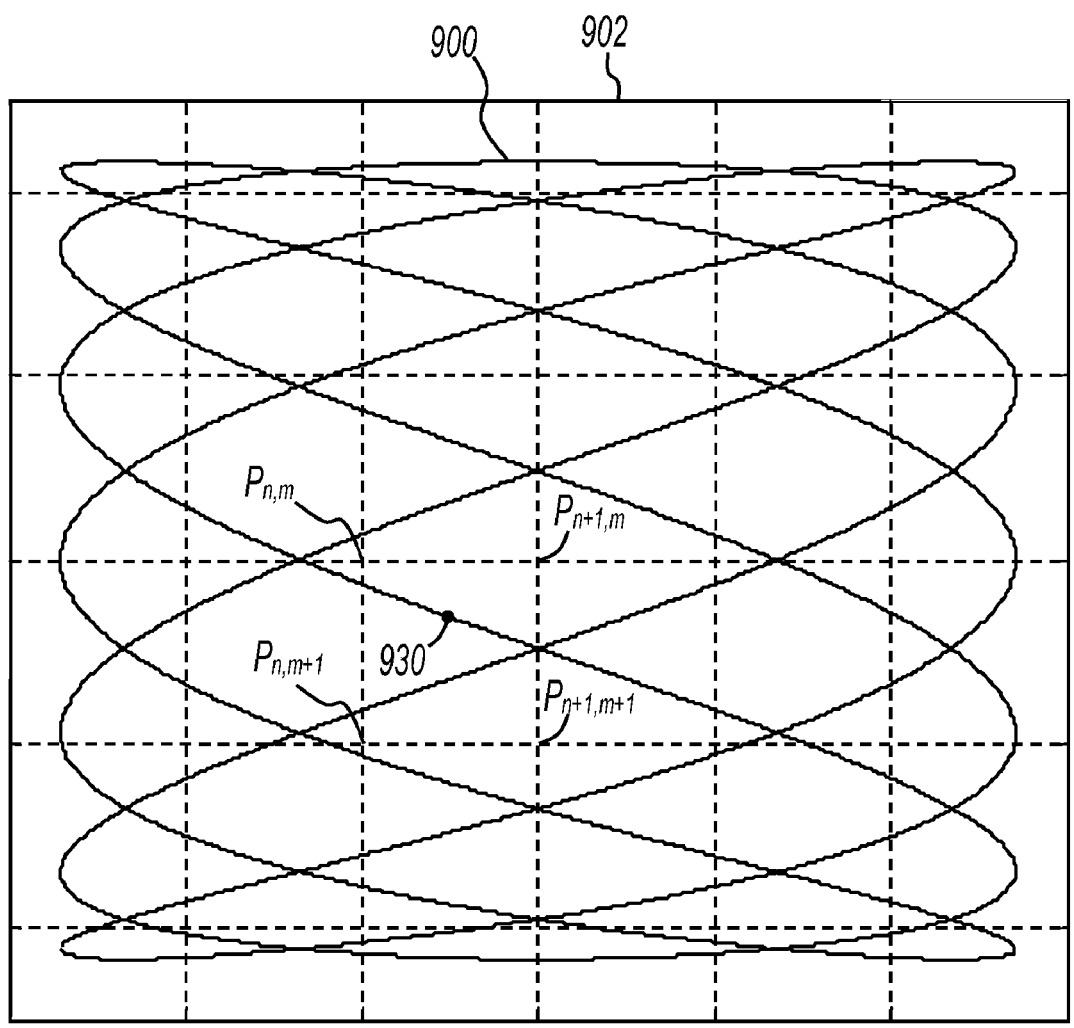
FIG. 9 shows a scan trajectory having a sinusoidal horizontal component and a sinusoidal vertical component.

An example of interpolation between four pixels is shown in FIG. 9. Equation (4) provides interpolation between pixels in different rows and different columns. In operation, row buffer 822 holds as many rows as necessary to accommodate one horizontal sweep. Further, vertical misalignment may be corrected by accessing one or more rows above or below the calculated vertical scan position. In some embodiments, vertical color misalignment is reduced in this manner. Prior to each horizontal sweep, row buffer 822 is loaded with multiple rows of pixel data from frame buffer 112. Power is saved because random access within frame buffer 112 is not required.

FIG. 9 shows a scan trajectory having a sinusoidal horizontal component and a sinusoidal vertical component. Scan trajectory 900 is shown superimposed on grid 902. Grid 902 represents rows and columns of pixels that make up a display image. The rows of pixels are aligned with the horizontal dashed lines, and columns of pixels are aligned with the vertical dashed lines. Grid 902 is shown having fewer pixels than grid 302 (FIG. 3), but this is not a limitation of the present invention. Any image resolution may be used with any scan trajectory. Scan trajectory 900 corresponds to a beam that is swept sinusoidally and bi-directionally in both the horizontal and vertical dimensions. Displayed pixel 930 corresponds to the scan position when one pixel clock arrives. The pixel intensity for displayed pixel 930 is interpolated from the four surrounding pixels. Depending on the image resolution and the sweep rate, many displayed pixels may occur between image pixels.

Figure 10:
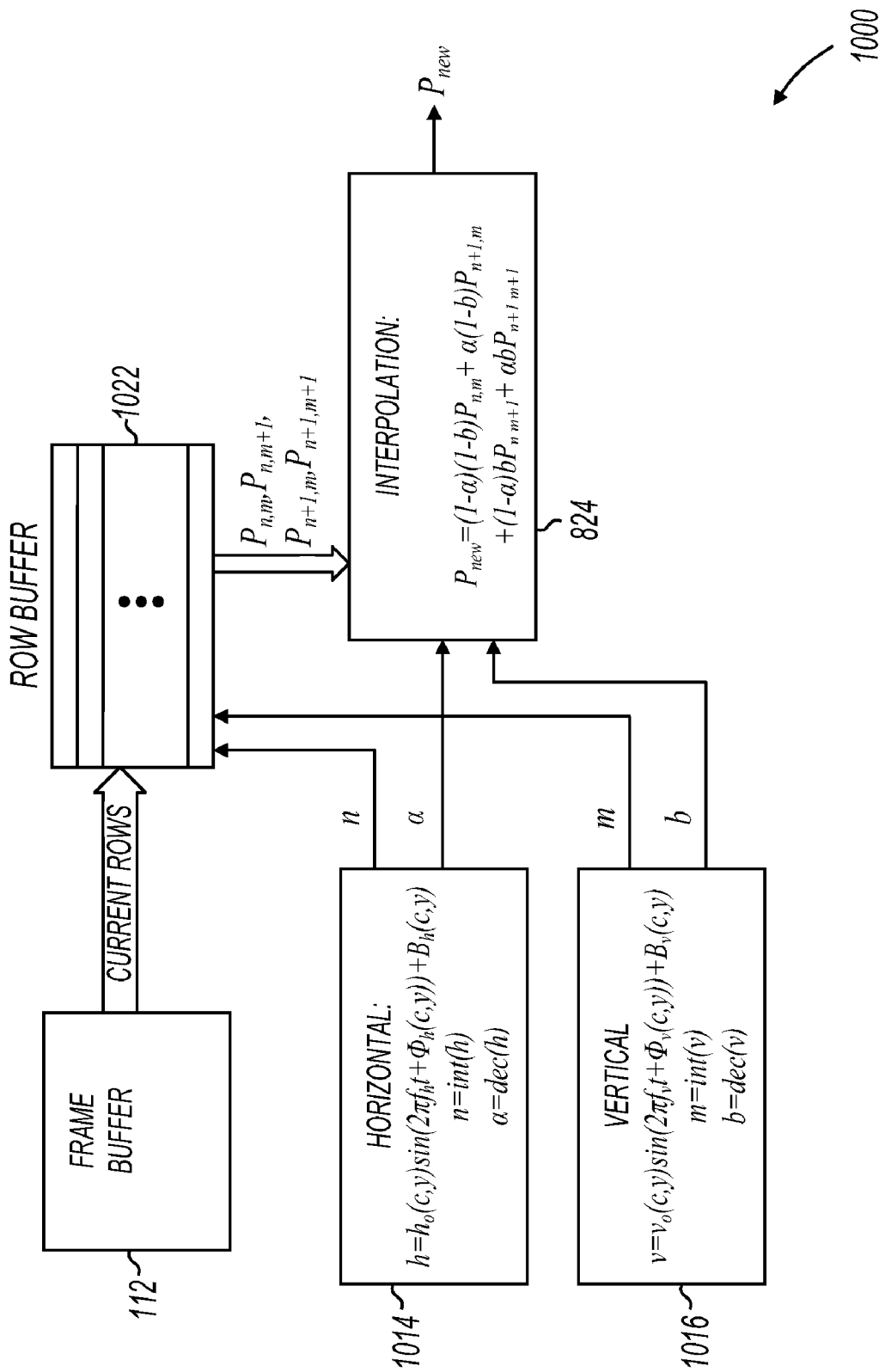
FIG. 10 shows an image processing device with interpolation and distortion correction for the scan trajectory of FIG. 9.

FIG. 10 shows an image processing device with interpolation and distortion correction for the scan trajectory of FIG. 9. Image processing device 1000 is similar to device 800 (FIG. 8), except that the vertical scan position is determined as a function of a sinusoid instead of a linearly increasing function, and both sine functions also have a variable phase as a function of color and vertical position.

Image processing device 1000 includes frame buffer 112, row buffer 1022, horizontal scan position determination component 1014, vertical scan position determination component 1016, and interpolation and distortion correction component 824. The interpolation is performed in the same manner as that shown in equation (4), above.

The vertical scan position is determined as the sum of an offset and a scaled sinusoid of a linearly increasing angle. The scaling and offset can provide distortion correction in the vertical dimension, however, increased vertical scaling and offsets increase the size of row buffer 1022, resulting in a trade-off between vertical distortion correction and power consumption due to the size of row buffer 1022. In some embodiments, the size of row buffer 1022 is large enough to accommodate the largest number of rows traversed by a horizontal sweep of the scan trajectory. For example, a horizontal sweep may traverse two rows, in which case row buffer 1022 has at least two rows. Also for example, a horizontal sweep may traverse five rows, in which case row buffer 1022 has at least five rows. The number of rows traversed in a horizontal sweep and the minimum number of rows in the row buffer are a function of the trajectory, and the various embodiments of the invention are not limited thereby. Any trajectory may be used, and any number of rows may be traversed in a single horizontal sweep.

Both the horizontal scan position function and the vertical scan position function are shown having variable phase values that are a function of color and/or vertical position. This may be utilized to correct for delays in laser driver electronics or other circuits. In general, phase values may vary based on any criteria, and variable phase functions may be included in any of the disclosed embodiments without departing from the scope of the present invention.

Figure 11:
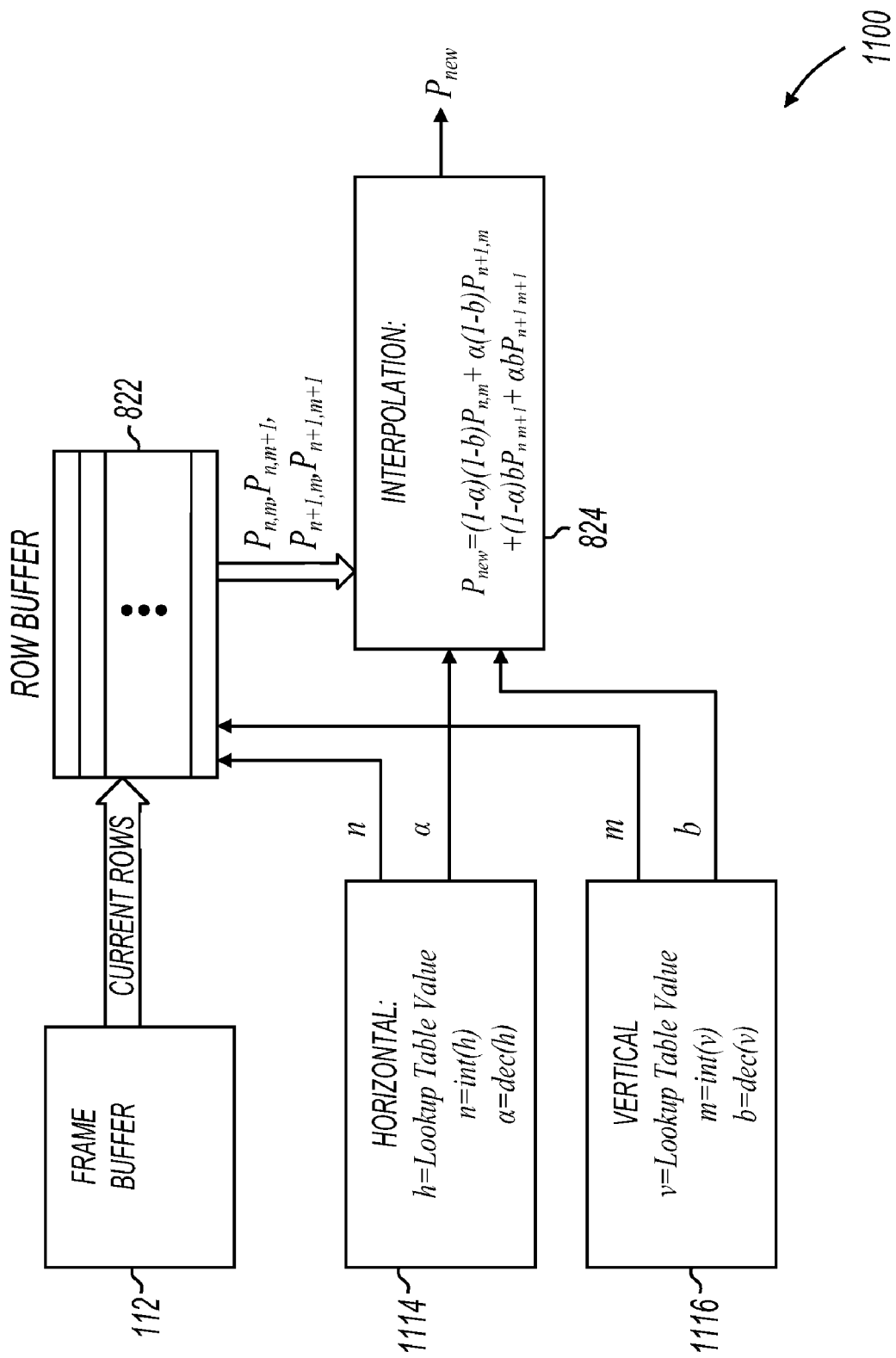
FIG. 11 shows an image processing device with interpolation and distortion correction for an arbitrary scan trajectory.

FIG. 11 shows an image processing device with interpolation and distortion correction for an arbitrary scan trajectory. Image processing device 1100 is similar to device 1000 (FIG. 10), except that the vertical and horizontal scan positions are determined using lookup tables. In operation, this provides scan Is position determination for any arbitrary scan trajectory.

Image processing device 1000 includes frame buffer 112, row buffer 1022, horizontal scan position determination component 1114, vertical scan position determination component 1116, and interpolation and distortion correction component 824. The interpolation is performed in the same manner as that shown in equation (4), above.

Figure 12:
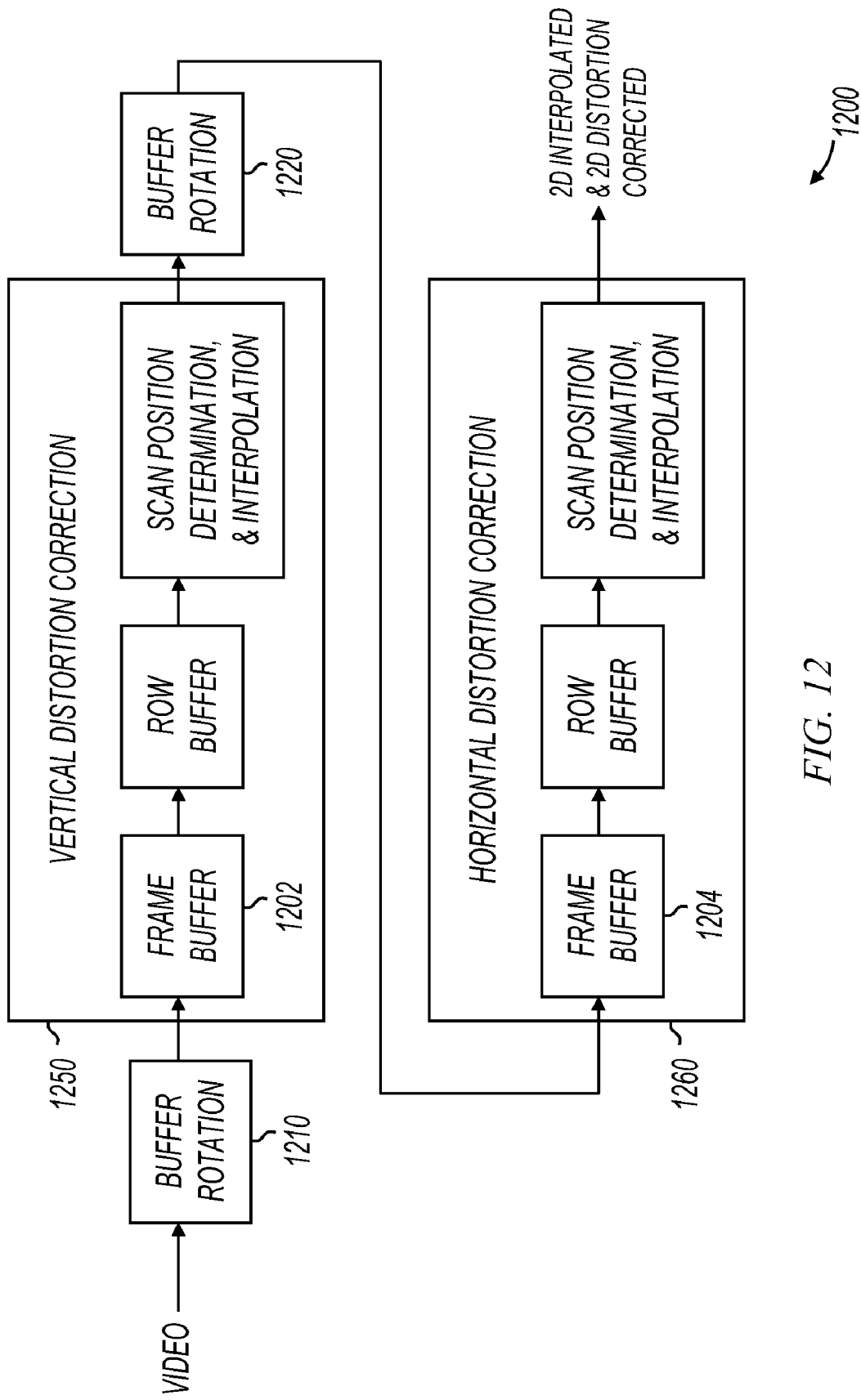
FIG. 12 shows an image processing device with horizontal and vertical pixel interpolation and distortion correction.

FIG. 12 shows an image processing device with horizontal and vertical pixel interpolation and distortion correction. Image processing device 1200 includes device 1250 to provide vertical interpolation and distortion correction, and device 1260 to provide horizontal interpolation and distortion correction. Devices 1250 and 1260 may be any combination of image processing devices disclosed herein, such as those shown in FIGS. 1, 4, 8, 10, and 11.

Image processing device 1200 is a solution that provides vertical distortion correction without increasing the size of a row buffer. This is achieved by rotating the image using buffer rotation 1210, and then performing horizontal interpolation and distortion correction. The buffer rotation swaps rows and columns in the buffer so that the horizontal and vertical dimensions are swapped. Accordingly, the "horizontal" operations within device 1250 are actually performed in the vertical image direction since the image has been rotated. The image is then rotated again using buffer rotation 1220, and horizontal interpolation and distortion correction is again performed. The result is two-dimensional (2D) interpolation and distortion correction without requiring large row buffers. In real-time systems, where the interpolation and distortion correction occurs on a frame-by-frame basis, the device of FIG. 12 may introduce additional latency equal to about one frame period.

In some embodiments frame buffers 1202 and 1204 are roughly the same size. For example, frame buffer 1202 maybe 600×800×3, and frame buffer 1204 may be 800×600×3. In other embodiments, frame buffer 1204 may be larger than frame buffer 1202 to accommodate the increased number of pixels resulting from the interpolation in device 1250. For example, frame buffer 1202 may be 600×800×3 and frame buffer 1204 may be 800×1250×3.

Figure 13:
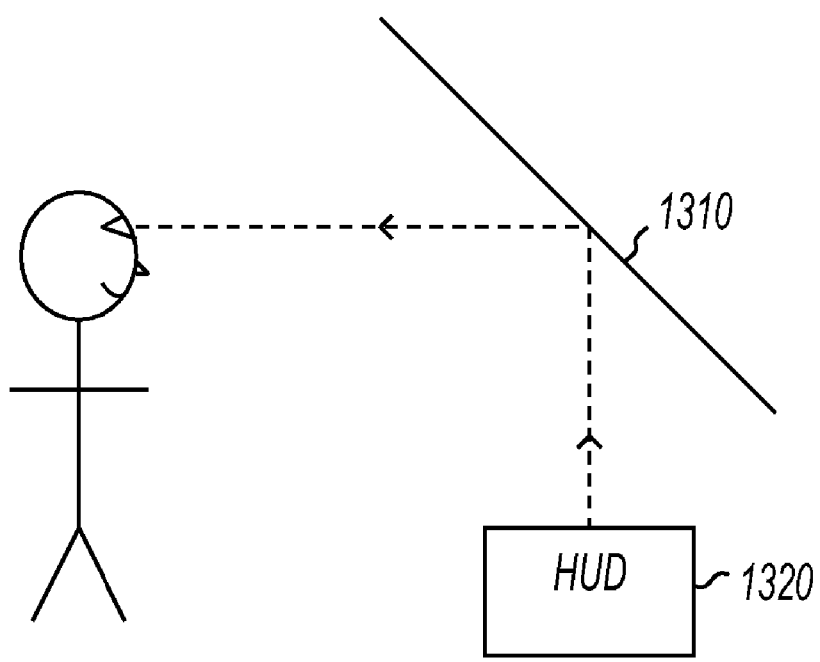
FIG. 13 shows a user viewing a head-up-display (HUD)

FIG. 13 shows a user viewing a head-up-display (HUD). HUD 1320 projects an image on surface 1310 to be viewed by the user. Surface 1310 may be any surface, including an eyeglass lens, a window pane, an automobile or aircraft windshield, or the like. Surface 1310 may introduce image distortion beyond distortions caused by electronics and color misalignment (which are corrected for using embodiments described above). For example, the curvature of a windshield may cause image distortion.

Source data for HUD 1320 may have a lower resolution than a typical video display. For example, an automotive application may have source data with a resolution of 400× 200 or lower, although this is not a limitation of the present invention. HUD 1320 may have any resolution without departing from the scope of the present invention.

Figure 14:
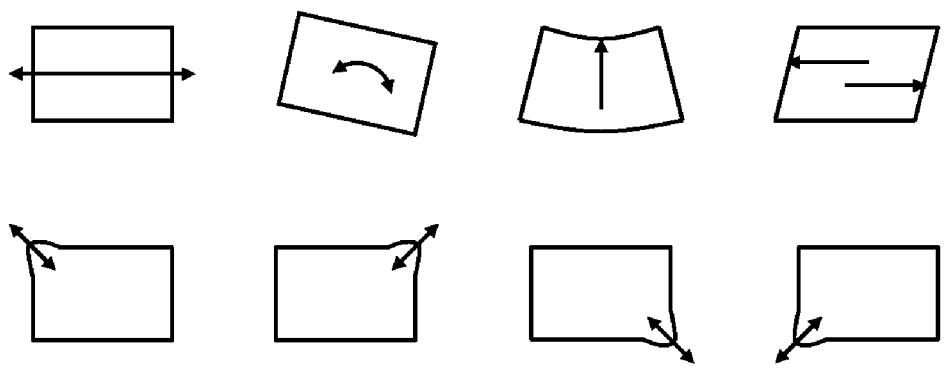
FIG. 14 shows a set of image warpings that correspond to basis functions.

FIG. 14 shows a set of image warpings that correspond to a basis set of distortions. Basis distortions and parameterized basis distortion matrices are described in more detail below with reference to FIG. 17. Any desired image warping can be achieved as a linear combination of parameterized versions of these basis distortions. This gives access to completely arbitrary two dimensional distortions including smile/frown curved distortions common to scanned displays and also asymmetric distortions. The basis distortions shown in FIG. 14 are meant to be examples, and are not meant to be limiting.

Figure 15:
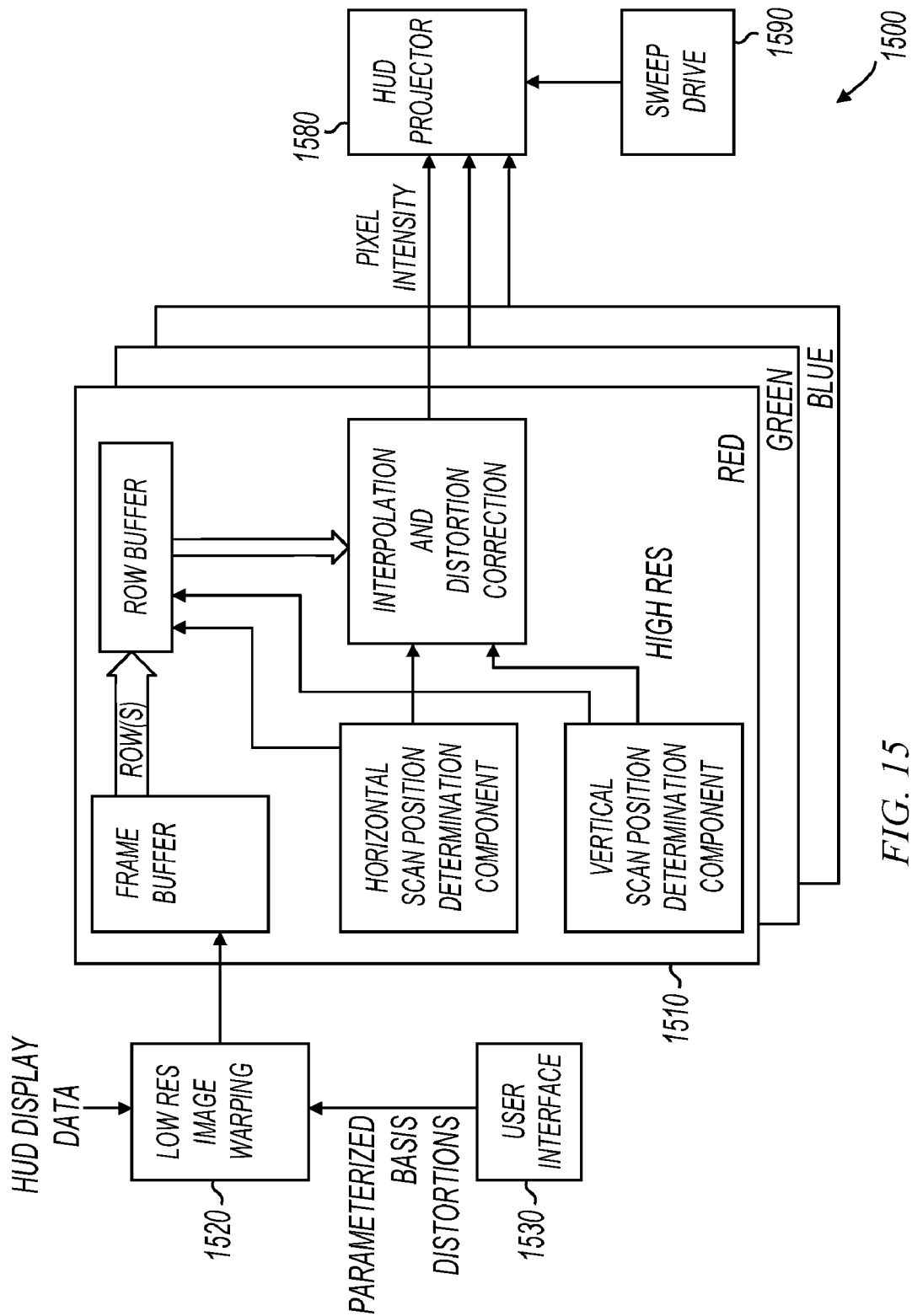
FIG. 15 shows a head-up-display (HUD) device that includes a low resolution image warping engine followed by a higher resolution interpolation and distortion correction engine.

FIG. 15 shows a head-up-display (HUD) device that includes a low resolution image warping engine followed by a higher resolution interpolation and distortion correction engine. HUD device 1500 includes low resolution image warping engine 1520, user interface 1530, image processing device(s) 1510, HUD projector 1580, and sweep drive 1590.

Image warping engine 1520 receives parameter values for each basis distortion from a user interface 1530. The user interface may only be available to a manufacturer or installer, or may be available to an end user. For example, in an automotive application, a manufacturer or installer may use the user interface to calibrate the HUD to the curvature of a particular windshield or other display surface. In these applications, an end user may never see the user interface that allows modification of the basis distortion parameters. Also for example, an end user that purchases a HUD may have access to the user interface in order to calibrate it for its intended purpose.

Image warping engine 1520 receives the HUD display data and applies the basis distortions with the desired parameter values to correct for image warp that results from characteristics of the intended display surface. The results are loaded in the frame buffer of image processing device 1510. Image processing device 1510 may be any of the image processing devices disclosed herein. Image processing device 1510 may interpolate and provide distortion correction using any of the disclosed embodiments. HUD projector 1580 may be any suitable projector (e.g., 200, FIG. 2), and sweep drive 1590 provides sweep signals to the projector as previously described.

Image processing device 1510 operates at a higher resolution than warping engine 1520. In some embodiments, image processing device 1510 operates at resolutions suitable for viewing movies or presentations, while warping engine 1520 only operates at resolutions needed for a typical head-up display application.

Figure 16:
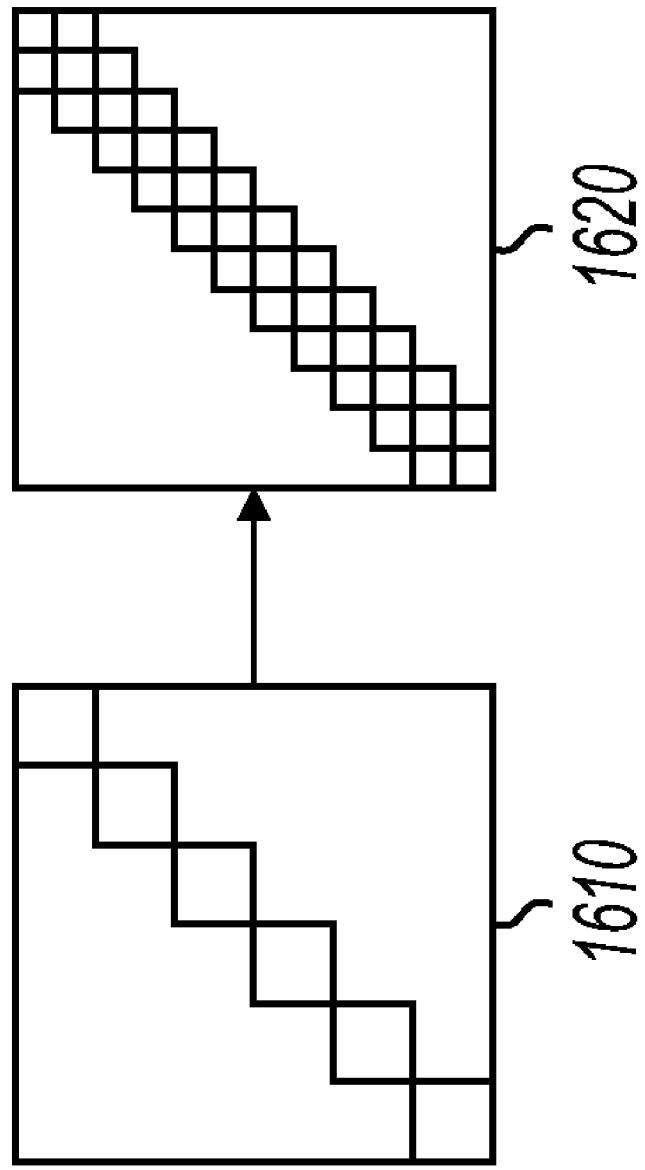
FIG. 16 shows representative image resolutions for the apparatus of FIG. 14.

FIG. 16 shows representative image resolutions for the apparatus of FIG. 15. Image 1610 is shown having a relatively coarse resolution suitable for a head-up display. The resolution of image 1610 may correspond to the HUD display data for HUD 1500 (FIG. 15). The resolution of image 1610 may also correspond to the output of image warping engine 1520.

The resolution of image 1620 may correspond to the output of image processing device 1510 and the image displayed by HUD projector 1580. As described above, since image processing device 1510 interpolates at locations of a constant pixel clock, the number of pixels displayed may be much greater than the number of pixels in the source image. Accordingly, the HUD application benefits from a smoothed image that results from interpolation and increased resolution.

Figure 17:
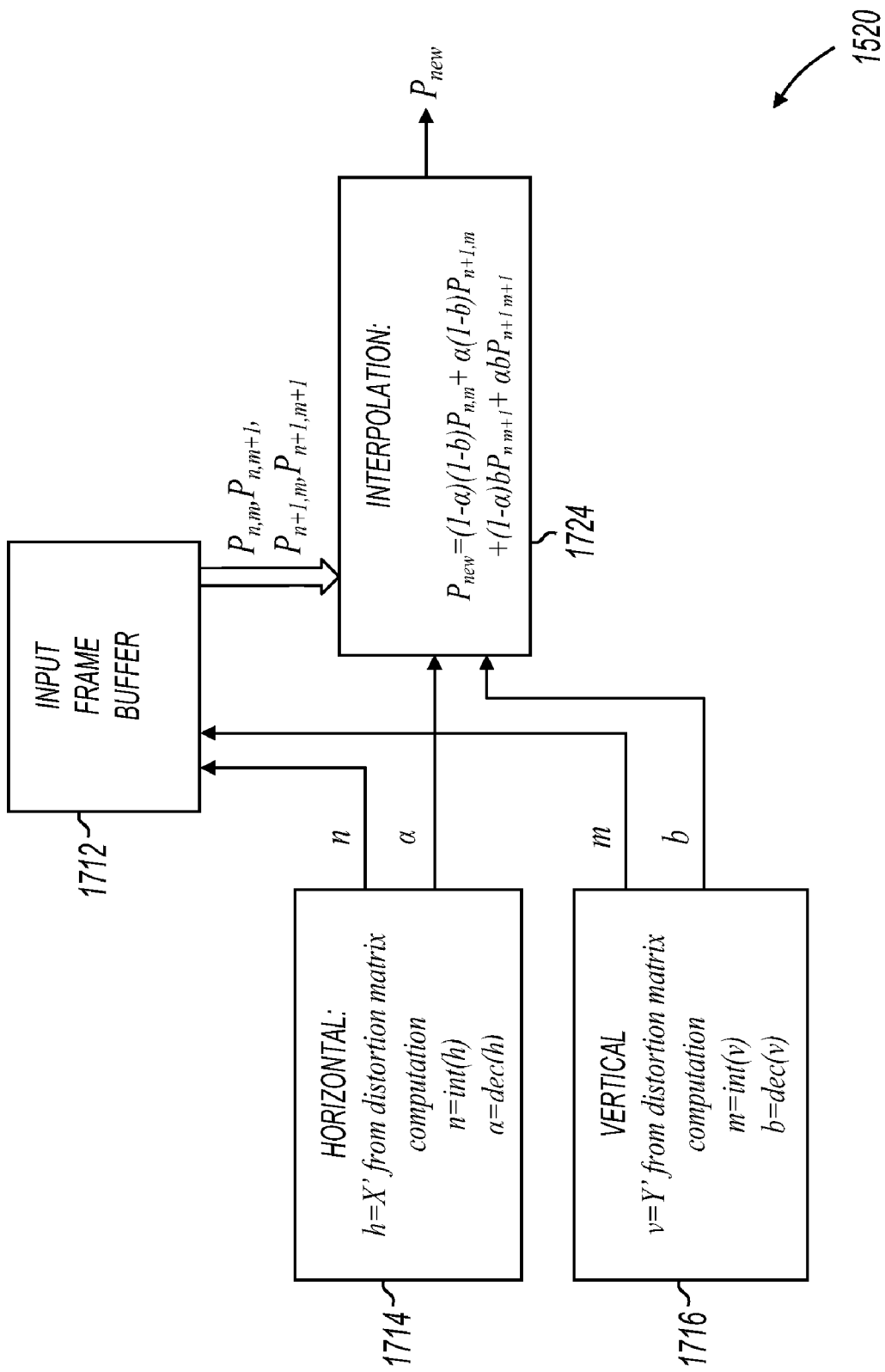
FIG. 17 shows a 2D image warping engine.

FIG. 17 shows a two dimensional image warping engine with interpolation. Image warping engine 1520 represents image warping engine embodiments useful for low resolution image warping engine 1520 in FIG. 15. Image warping engine 1520 includes input frame buffer 1712, horizontal position determination component 1714, vertical position determination component 1716, and interpolator 824. In contrast to embodiments described previously, horizontal position determination component 1714 and vertical position determination component 1716 do not determine a current position of a beam scanning over an image. Rather, these components determine which pixels should be retrieved from the input frame buffer to effect a particular set of image warpings based on a combined set of parameterized basis distortions. For example, image warping engine 1520 may start with pixel 0,0 of the output image and determine which pixels in the input frame buffer should be retrieved for interpolation to create the output pixel 0,0. The engine may then proceed to pixel 0,1, and then continue to populate the output image row by row and column by column.

Various exemplary parameterized basis distortions are now described. In the following matrix manipulations, X,Y are the pixel coordinates in the output image produced by image warping engine 1520, and X',Y' are pixel coordinates in the input frame buffer. Image warping is accomplished by multiplying the rightmost matrix with the parameterized basis distortion matrix to arrive at the input frame buffer pixel location in the leftmost matrix.

Rotation distortion is accomplished by the following $$\begin{bmatrix} X' \\ Y' \\ \text{don't care} \\ \text{don't care} \end{bmatrix} = \begin{bmatrix} a_{rot} & b_{rot} & 0 & 0 \\ -b_{rot} & a_{rot} & 0 & 0 \\ 0 & 0 & 1 & 0 \\ 0 & 0 & 0 & 1 \end{bmatrix} \begin{bmatrix} X \\ Y \\ X^2 \\ X^2 Y^2 \end{bmatrix} \quad (5)$$

where $-a_{rot}=\cos\theta$, $b_{rot}=\sin\theta$, and $\theta$ is the rotation angle. The rightmost matrix includes X and Y which represent the location of the pixel in the output of the image warping engine. The rightmost matrix also includes terms $X^2$ and $X^2Y^2$. In the rotation distortion these higher order terms are not used, but in other parameterized basis distortions they are.

Smile distortion is accomplished by the following:

$$\begin{bmatrix} X' \\ Y' \\ \text{don't care} \\ \text{don't care} \end{bmatrix} = \begin{bmatrix} 1 & 0 & 0 & 0 \\ 0 & 1 & a_{sm} & 0 \\ 0 & 0 & 1 & 0 \\ 0 & 0 & 0 & 1 \end{bmatrix} \begin{bmatrix} X \\ Y \\ X^2 \\ X^2 Y^2 \end{bmatrix} \quad (6)$$

where $a_{sm}$ is the parameter that operates on the squared term in the input matrix.

Parallelogram distortion is accomplished by the following:

$$\begin{bmatrix} X' \\ Y' \\ \text{don't care} \\ \text{don't care} \end{bmatrix} = \begin{bmatrix} 1 & a_{pl} & 0 & 0 \\ 0 & 1 & 0 & 0 \\ 0 & 0 & 1 & 0 \\ 0 & 0 & 0 & 1 \end{bmatrix} \begin{bmatrix} X \\ Y \\ X^2 \\ X^2Y^2 \end{bmatrix} \quad (7)$$

where $\alpha_{pl}$ is the parameter that dictates the amount of skew applied to create the parallelogram distortion.

The upper right corner of the image may be stretched using the following:

$$\begin{bmatrix} X' \\ Y' \\ \text{don't care} \\ \text{don't care} \end{bmatrix} = \begin{bmatrix} 1 & 0 & 0 & a_{sur} \\ 0 & 1 & 0 & b_{sur} \\ 0 & 0 & 1 & 0 \\ 0 & 0 & 0 & 1 \end{bmatrix} \begin{bmatrix} X \\ Y \\ X^2 \\ X^2Y^2 \end{bmatrix} \quad (8)$$

where $\alpha_{sur}$ and $b_{sur}$ ("sur" refers to "stretch upper right") are parameters that operate on the $X^2Y^2$ term in the input matrix, and $\alpha_{sur}=\alpha^2$, $b_{sur}=\alpha_{sur}/n^2$, and n=10 (horizontal resolution)/(vertical resolution). Upper left stretch, lower right stretch, and lower left stretch operations are formulated similarly as shown below in equations 9, 10, and 11, respectively.

$$\begin{bmatrix} X' \\ Y' \\ \text{don't care} \\ \text{don't care} \end{bmatrix} = \begin{bmatrix} 1 & 0 & 0 & -a_{sul} \\ 0 & 1 & 0 & b_{sul} \\ 0 & 0 & 1 & 0 \\ 0 & 0 & 0 & 1 \end{bmatrix} \begin{bmatrix} X \\ Y \\ X^2 \\ X^2Y^2 \end{bmatrix} \quad (9)$$

-continued $$\begin{bmatrix} X' \\ Y' \\ \text{don't care} \\ \text{don't care} \end{bmatrix} = \begin{bmatrix} 1 & 0 & 0 & a_{slr} \\ 0 & 1 & 0 & b_{slr} \\ 0 & 0 & 1 & 0 \\ 0 & 0 & 0 & 1 \end{bmatrix} \begin{bmatrix} X \\ Y \\ X^2 \\ X^2Y^2 \end{bmatrix} \quad (10)$$

$$\begin{bmatrix} X' \\ Y' \\ \text{don't care} \\ \text{don't care} \end{bmatrix} = \begin{bmatrix} 1 & 0 & 0 & -a_{sll} \\ 0 & 1 & 0 & b_{sll} \\ 0 & 0 & 1 & 0 \\ 0 & 0 & 0 & 1 \end{bmatrix} \begin{bmatrix} X \\ Y \\ X^2 \\ X^2Y^2 \end{bmatrix} \quad (11)$$

In some embodiments, the various transformation matrices may be combined to accomplish multiple distortions using a single matrix computation. For example, a combination rotation and smile distortion can be applied using:

$$\begin{bmatrix} X' \\ Y' \\ \text{don't care} \\ \text{don't care} \end{bmatrix} = \begin{bmatrix} a_{rot} & b_{rot} & 0 & 0 \\ -b_{rot} & a_{rot} & 0 & 0 \\ 0 & 0 & 1 & 0 \\ 0 & 0 & 0 & 1 \end{bmatrix} \begin{bmatrix} 1 & 0 & 0 & 0 \\ 0 & 1 & a_{sm} & 0 \\ 0 & 0 & 1 & 0 \\ 0 & 0 & 0 & 1 \end{bmatrix} \begin{bmatrix} X \\ Y \\ X^2 \\ X^2Y^2 \end{bmatrix} \quad (12)$$

If the rotation distortion matrix and the smile distortion matrix are combined, we get:

$$\begin{bmatrix} X' \\ Y' \\ \text{don't care} \\ \text{don't care} \end{bmatrix} = \begin{bmatrix} a_{rot} & b_{rot} & b_{rot}a_{sm} & 0 \\ -b_{rot} & a_{rot} & a_{rot}a_{sm} & 0 \\ 0 & 0 & 1 & 0 \\ 0 & 0 & 0 & 1 \end{bmatrix} \begin{bmatrix} X \\ Y \\ X^2 \\ X^2Y^2 \end{bmatrix} \quad (13)$$

where the rotation and the smile distortions are parameterized through their corresponding matrix coefficients. For example, if there is to be no rotation (θ=0), then $\alpha_{rot}=1$, $b_{rot}=0$, and we are left with only the smile distortion matrix. Also for example, if there is to be no smile distortion, then $\alpha_{sm}=0$, and we are left with the rotation distortion matrix. As shown in equation (12), the individual basis distortion matrices may be kept square by adding additional rows at the bottom and columns to the right with an identity diagonal extending to the lower right corner. By keeping the basis distortion matrices square, they can be combined as described above.

As another example of combined basis distortions, equation (14) combines rotation, smile, parallelogram, and stretch lower right distortions.

$$\begin{bmatrix} X' \\ Y' \\ \text{don't care} \\ \text{don't care} \end{bmatrix} = \begin{bmatrix} a_{rot} & a_{rot}a_{pl}+b_{rot} & b_{rot}a_{sm} & a_{rot}a_{slr}+b_{slr}(a_{rot}a_{pl}+b_{rot}) \\ -b_{rot} & -b_{rot}a_{pl}+a_{rot} & a_{rot}a_{sm} & a_{slr}(-b_{rot})+b_{slr}(-b_{rot}a_{pl}+a_{rot}) \\ 0 & 0 & 1 & 0 \\ 0 & 0 & 0 & 1 \end{bmatrix} \begin{bmatrix} X \\ Y \\ X^2 \\ X^2Y^2 \end{bmatrix} \quad (14)$$

Any number of parameterized distortion matrices can be combined in this manner. After combining, the resulting transformation matrix is of the form:

$$\begin{bmatrix} X' \\ Y' \\ \text{don't care} \\ \text{don't care} \end{bmatrix} = \begin{bmatrix} a_{11} & a_{12} & a_{13} & a_{14} \\ a_{21} & a_{22} & a_{23} & a_{24} \\ 0 & 0 & 1 & 0 \\ 0 & 0 & 0 & 1 \end{bmatrix} \begin{bmatrix} X \\ Y \\ X^2 \\ X^2Y^2 \end{bmatrix} \quad (15)$$

where $\alpha_{nm}$ are each a function of one or more parameters that implement the basis distortions. The rightmost matrix in equation (14) is shown expanded to include higher order terms along with the pixel coordinates X and Y in the output image. Two higher order terms ($X^2$ and $X^2Y^2$) are included. Any number of higher order terms may be included without departing from the scope of the present invention. Further, once the desired basis distortions are combined in the parameterized combined distortion matrix, the nonessential rows of the two leftmost matrices can be removed.

Accordingly, equation (15) more generally becomes:

$$\begin{bmatrix} X' \\ Y' \end{bmatrix} = \begin{bmatrix} a_{11}(\alpha_{dist\_1}, \alpha_{dist\_2}, \alpha_{dist\_3}, \Lambda) & a_{12}(\beta_{dist\_1}, \beta_{dist\_2}, \beta_{dist\_3}, \Lambda)\Lambda \\ a_{21}(\gamma_{dist\_1}, \gamma_{dist\_2}, \gamma_{dist\_3}, \Lambda) & a_{22}(\delta_{dist\_1}, \delta_{dist\_2}, \delta_{dist\_3}, \Lambda)\Lambda \end{bmatrix} \begin{bmatrix} X \\ Y \\ f_1(X, Y) \\ f_2(X, Y) \\ f_3(X, Y) \\ M \end{bmatrix}$$

The rightmost matrix of equation (16) is shown having a single N×1 vector with N−2 higher order terms that are a function of the output/destination pixel space. N can be any number. Different higher order terms provide for different possible image distortions. The combined distortion matrix in the center is a 2×N matrix that includes parameterized terms related to the various possible distortions. The subscripts indicate parameters associated with a particular basis distortion. The leftmost matrix includes a 2×1 vector that includes X' and Y' representing the fractional coordinates of the input space to the 2D interpolation.

Referring now back to FIG. 17, horizontal position determination component 1714 determines X' and vertical position determination component 1716 determines Y', and these pixel locations are provide to the input frame buffer so that pixels to the left and right of X' and above and below Y' can be provided to interpolator 1724. In practice, a single matrix computation is performed to arrive at X' and Y'. This matrix computation may be performed in either hardware, software, or any combination without departing from the scope of the present invention.

Figure 18:
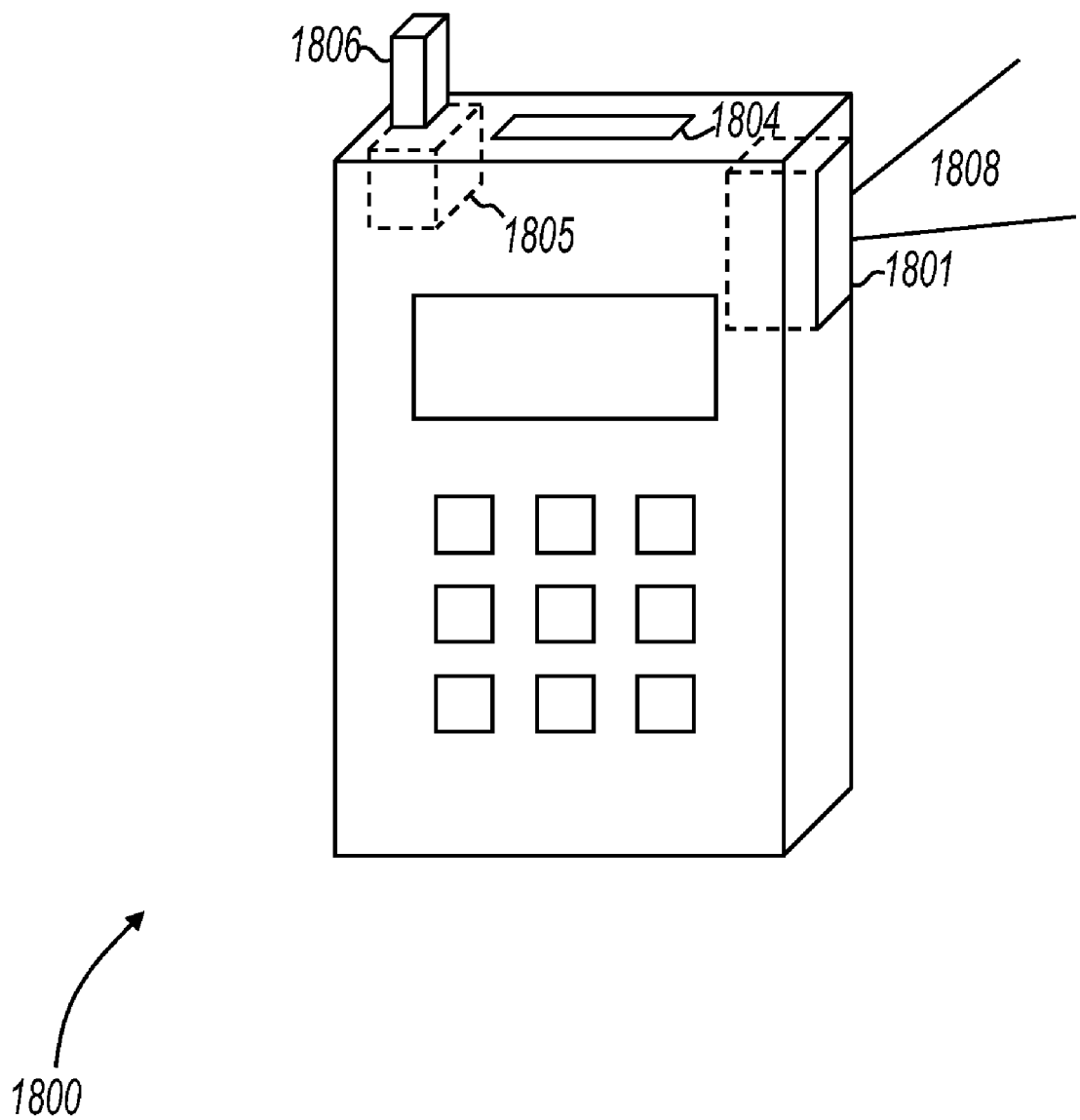
FIG. 18 shows a mobile device in accordance with various embodiments of the present invention.

FIG. 18 shows a mobile device in accordance with various embodiments of the present invention. Mobile device 1800 may be a hand held projection device with or without communications ability. For example, in some embodiments, mobile device 1800 may be a handheld projector with little or no other capabilities. Also for example, in some embodiments, mobile device 1800 may be a device usable for communications, including for example, a cellular phone, a smart phone, a personal digital assistant (PDA), a global positioning system (GPS) receiver, or the like. Further, mobile device 1800 may be connected to a larger network via a wireless (e.g., WiMax) or cellular connection, or this device can accept data messages or video content via an unregulated spectrum (e.g., WiFi) connection.

Mobile device 1800 includes laser projector 1801 to create an image with light 1808. Similar to other embodiments of projection systems described above, mobile device 1800 may include a projector with one or two dimensional interpolation with distortion correction. Further, mobile device 1800 may provide image warping by applying a parameterized basis set of distortions to a low resolution image.

In some embodiments, mobile device 1800 includes antenna 1806 and electronic component 1805. In some embodiments, electronic component 1805 includes a receiver, and in other embodiments, electronic component 1805 includes a transceiver. For example, in GPS embodiments, electronic component 1805 may be a GPS receiver. In these embodiments, the image displayed by laser projector 1801 may be related to the position of the mobile device. Also for example, electronic component 1805 may be a transceiver suitable for two-way communications. In these embodiments, mobile device 1800 may be a cellular telephone, a two-way radio, a network interface card (NIC), or the like.

Mobile device 1800 also includes memory card slot 1804. In some embodiments, a memory card inserted in memory card slot 1804 may provide a source for video data to be displayed by laser projector 1801. Memory card slot 1804 may receive any type of solid state memory device, including for example, Multimedia Memory Cards (MMCs), Memory Stick DUOs, secure digital (SD) memory cards, and Smart Media cards. The foregoing list is meant to be exemplary, and not exhaustive.

Figure 19:
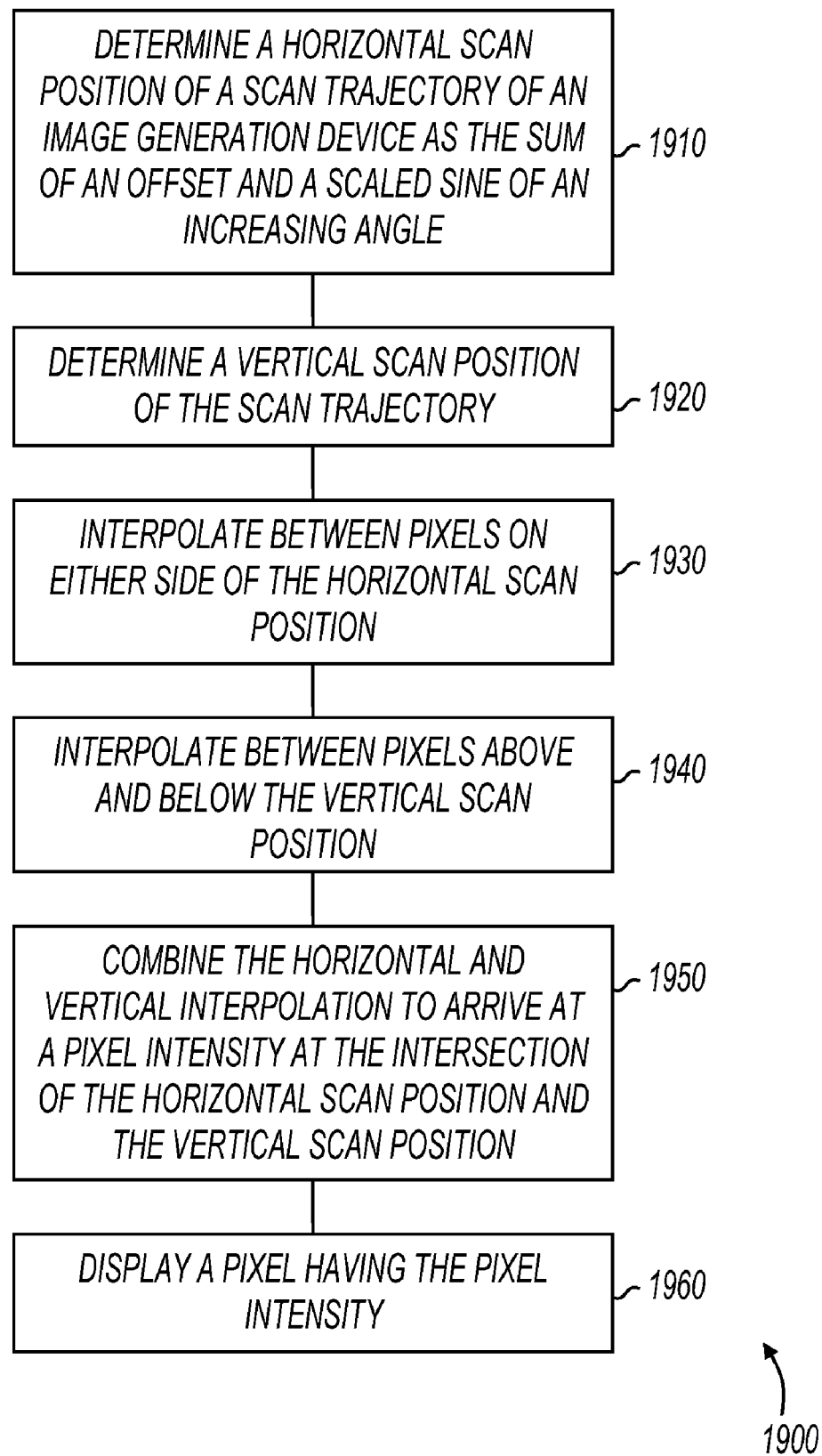
FIG. 19 shows a flowchart in accordance with various embodiments of the present invention.

FIG. 19 shows a flowchart in accordance with various embodiments of the present invention. In some embodiments, method 1900, or portions thereof, is performed by an image generation apparatus, a mobile projector, a head-up-display, or the like, embodiments of which are shown in previous figures. In other embodiments, method 1900 is performed by an integrated circuit or an electronic system. Method 1900 is not limited by the particular type of apparatus performing the method. The various actions in method 1900 may be performed in the order presented, or may be performed in a different order. Further, in some embodiments, some actions listed in FIG. 19 are omitted from method 1900.

Method 1900 is shown beginning with block 1910 in which a horizontal scan position of a scan trajectory is determined as the sum of an offset and a scaled sine of an increasing angle. The offset may be a function of color or vertical position, or both. Further, the multiplier used for scaling the sine function may also be a function of color or vertical position, or both. In addition, a phase offset in the argument of the sine function may be a function of color or vertical position or both.

At 1920, a vertical scan position of the scan trajectory is determined. In some embodiments, the vertical scan position may be determined as a sum of an offset and a scaled sine function similar to the horizontal scan position determination at 1910. In other embodiments, the vertical scan position may be determined as the position of a linear sweep function. In still further embodiments, the vertical scan position may be approximated as a closest row or a constant row for each horizontal sweep.

At 1930, interpolation is performed between pixels on either side of the horizontal scan position. In some embodiments, (e.g., where the vertical scan position is approximated as a constant row), horizontal interpolation is performed between pixels on the same row. In other embodiments, horizontal interpolation is performed between pixels in more than one row.

At 1940, interpolation is performed between pixels above and below the vertical scan position. In some embodiments, 1940 is omitted. For example, when the vertical scan position is approximated as a constant row, vertical interpolation is not performed.

At 1950, the horizontal and vertical interpolations are combined to arrive at a pixel intensity for a pixel to display. The pixel to display has been created using interpolation and scan position determination techniques that also provide for distortion correction. At 1960, the pixel is displayed. The pixel may be displayed using any suitable device, such as those shown in FIGS. 1, 2, and 15.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. An image generation apparatus comprising:
   a frame buffer to hold a plurality of rows of pixel data corresponding to a grid of display pixels;
   a row buffer coupled to the frame buffer to receive more than one but fewer than all of the plurality of rows of pixel data;
   a horizontal scan position determination component to periodically determine a horizontal scan position of a scan trajectory; and
   an interpolation component coupled to receive pixel data from the row buffer and operable to interpolate between display pixels on either side of the horizontal scan position;
   wherein the row buffer is operable to be loaded with a different set of rows of pixel data for each color to compensate for vertical misalignment of colors.

2. The image generation apparatus of claim 1 further comprising a vertical scan position determination component to periodically determine a vertical scan position of the scan trajectory.

3. The image generation apparatus of claim 2 wherein the vertical scan position determination component is operable to determine the vertical scan position as a sum of sine functions.

4. The image generation apparatus of claim 2 wherein the horizontal and vertical scan position determination components include lookup tables to implement arbitrary scan trajectories.

5. The image generation apparatus of claim 4 wherein the vertical scan position determination component is operable to determine the vertical scan position as a linearly advancing position over time.

6. The image generation apparatus of claim 4 wherein the vertical scan position determination component is operable to determine the vertical scan position as a sine of an increasing angle.

7. The image generation apparatus of claim 4 wherein the row buffer is sized to hold a number of rows greater than or equal to the maximum possible number of rows traversed in a single horizontal sweep of the scan trajectory.

8. A mobile device comprising:
   a laser projector to project an image, the laser projector including an image generation apparatus having a frame buffer to hold a plurality of rows of pixel data corresponding to a grid of display pixels, a row buffer coupled to the frame buffer to receive more than one but fewer than all of the plurality of rows of pixel data, a horizontal scan position determination component to periodically determine a horizontal scan position of a scan trajectory, and an interpolation component coupled to receive pixel data from the row buffer and operable to interpolate between display pixels on either side of the horizontal scan position, wherein the row buffer is operable to be loaded with a different set of rows of pixel data for each color to compensate for vertical misalignment of colors.

9. The mobile device of claim 8 further comprising a memory card slot.

10. The mobile device of claim 8 further comprising a communications receiver.

11. The mobile device of claim 8 further comprising a communications transceiver.

12. The mobile device of claim 11 wherein the communications transceiver is operable to communicate using cellular telephone signals.

* * * * *